Sept. 27, 1955 W. V. SPURLIN 2,718,957
MULTICONVEYOR PATH FEEDER BOWL
Filed March 16, 1951 4 Sheets-Sheet 2
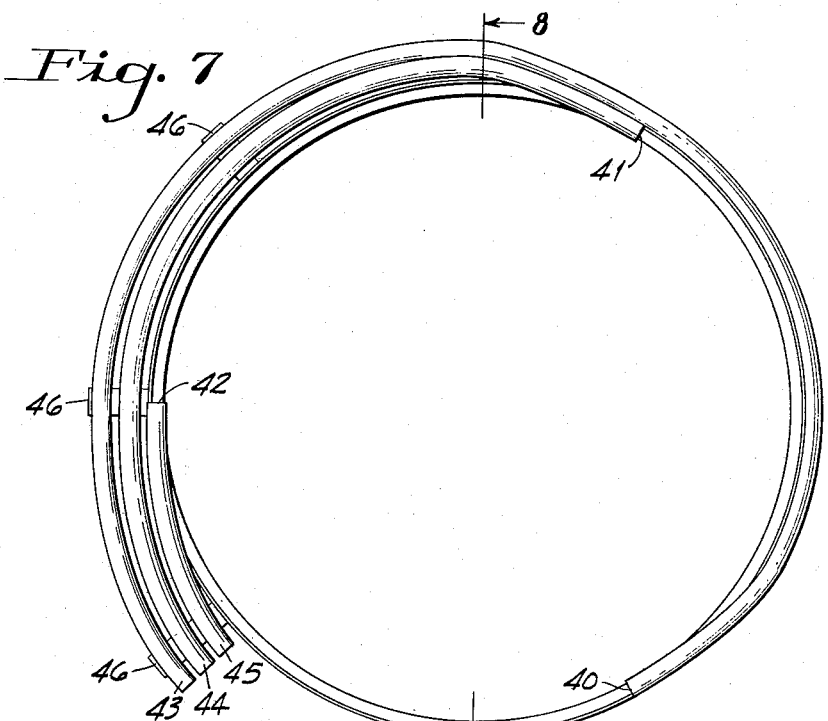
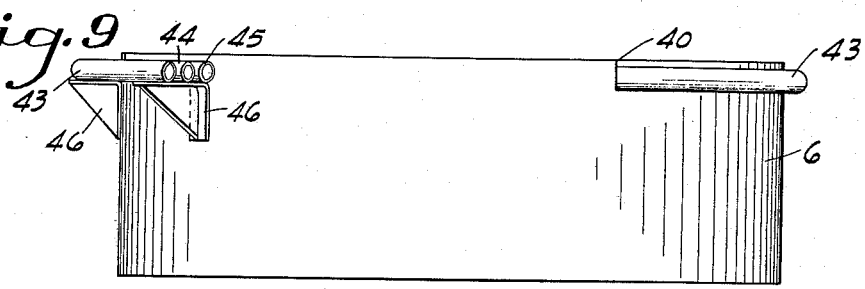
INVENTOR.
William V. Spurlin
BY
His Attorney.

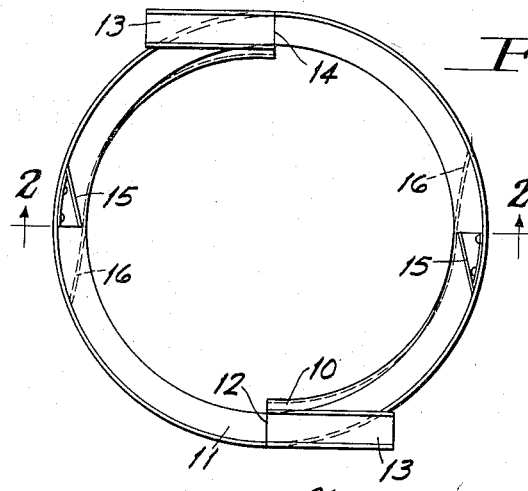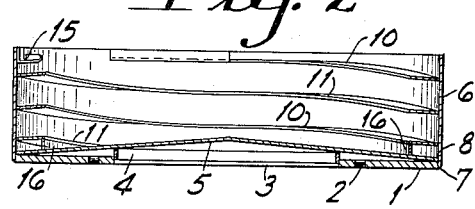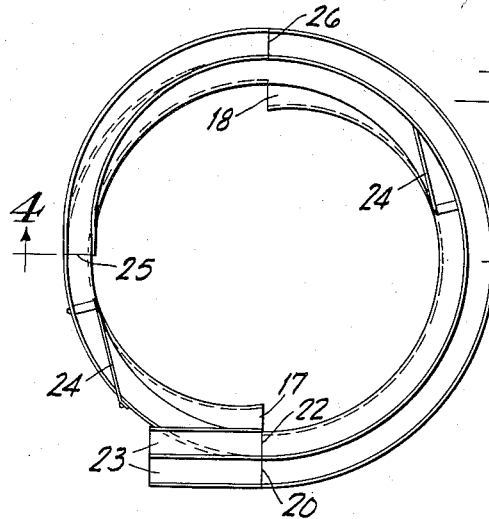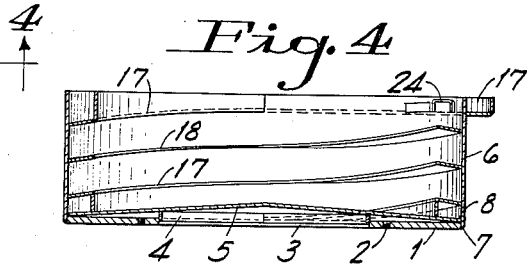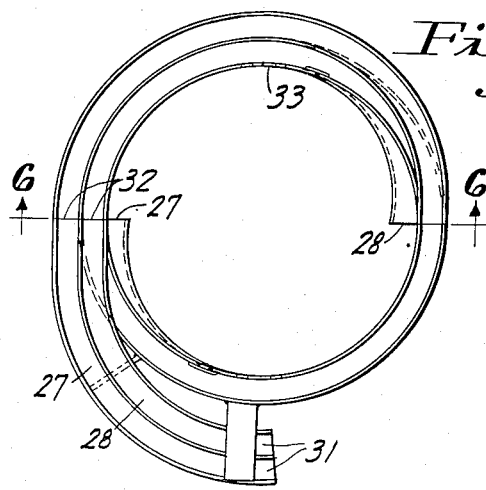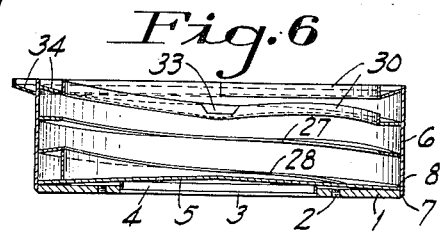
INVENTOR.
William V. Spurlin
BY William D. Carothers
His Attorney.

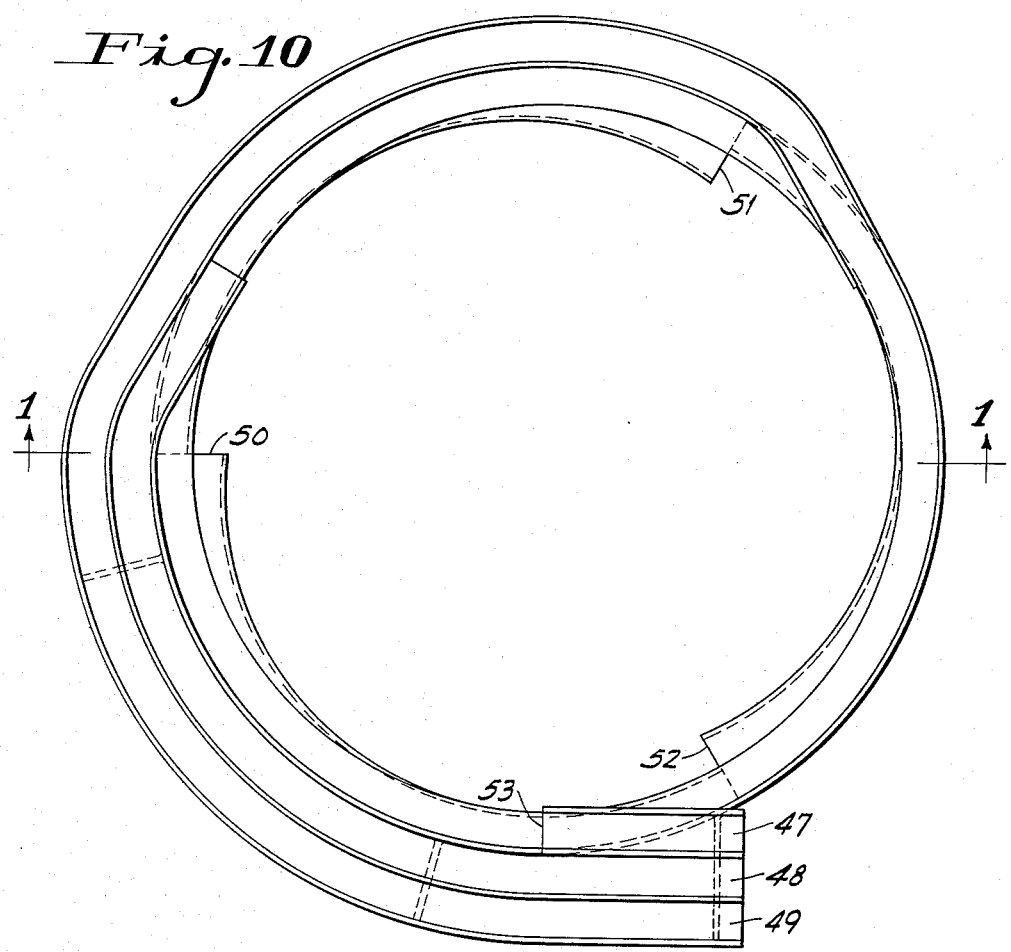
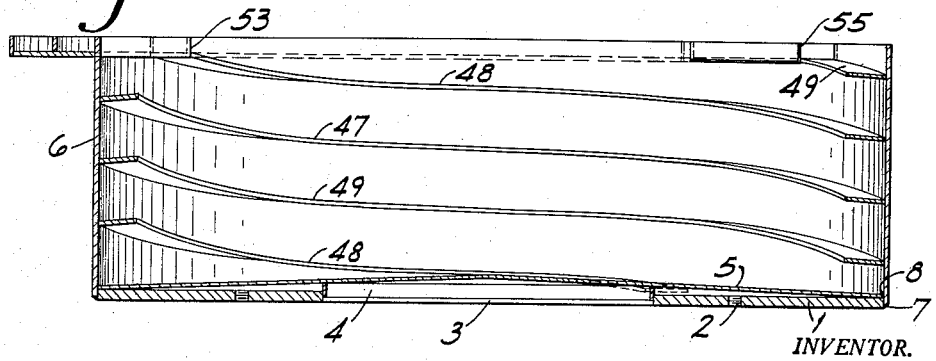

Sept. 27, 1955 W. V. SPURLIN 2,718,957
MULTICONVEYOR PATH FEEDER BOWL
Filed March 16, 1951 4 Sheets-Sheet 4

INVENTOR.
William V. Spurlin
BY
William D. Carothers
His Attorney

United States Patent Office 2,718,957
Patented Sept. 27, 1955

2,718,957

MULTICONVEYOR PATH FEEDER BOWL

William V. Spurlin, Indiana, Pa., assignor to Syntron Company, Homer City, Pa., a corporation of Delaware Application March 16, 1951, Serial No. 216,012

3 Claims. (Cl. 198—33)

This invention relates generally to conveyor feeder bowls and more particularly to feeder bowls having multi-conveyor paths for simultaneously delivering a plurality of articles.

The principal object of this invention is the provision of a bowl structure that may be mounted on a feeder motor which provides an inclined arcuate movement for the purpose of feeding articles from within the bowl upwardly along a plurality of helical paths on the side of the bowl and outwardly to tangential positions where each of the articles may be independently discharged or removed for use in assembly of machines or for performing other operations thereon.

The multiconveyor path feeder bowl comprising this invention permits articles to be fed simultaneously and at the same time corrects their relative position for use on the machine to which the articles are applied or for doing additional operations on the articles themselves or to orient them for assembly where it is necessary that the articles be presented in a certain position for facilitating their assembly on the machine or device of which the articles are a part.

Another object of this invention is to provide a plurality of the conveyor paths which start from a common floor and travel helically upwardly to a position near the top of the bowl where the conveyor paths branch out spirally to a tangential position and from which troughs or other extensions of spiral, arcuate or straight form, may be employed to finally deliver the plurality of articles simultaneously at a desired position.

Another object of this invention is the provision of a multiconveyor feeder bowl wherein the articles are picked up at relative angular positions in the bottom of the bowl and are delivered adjacent one another at the upper end of the conveyor.

Other objects and advantages appear hereinafter in the following description and claims.

The accompanying drawings show, for the purpose of exemplification without limiting the invention or claims thereto, certain practical embodiments of the invention wherein:

Fig. 1 is a top plan view of a multiconveyor path feeder bowl wherein the lower and upper ends of the conveyor paths are disposed at 180° to each other.

Fig. 2 is a sectional view taken on the line 2—2 of Fig. 1.

Fig. 3 is a plan view of a multiconveyor path feeder bowl wherein the lower end of the conveyor paths are angularly disposed relative to each other and the upper ends are adjacent to each other.

Fig. 4 is a sectional view taken along the line 4—4 of Fig. 3.

Fig. 5 is a view of a structure that is similar to that shown in Fig. 3 but illustrating the conveyor paths as traveling in the opposite direction and providing a spiral upper end of each of the conveyor paths.

Fig. 6 is a sectional view taken along the line 6—6 of Fig. 5.

Fig. 7 is a plan view of the multiconveyor feeder bowl having three conveyor paths which start at angular positions relative to the bowl and terminate at the upper end tubular conveyor paths adjacent one another.

Fig. 8 is a sectional view taken along the line 8—8 of Fig. 7.

Fig. 9 is a view in side elevation of the structure as shown in Fig. 7.

Fig. 10 is a top plan view of a multiconveyor path feeder bowl having three troughs each of which start at an angular distance relative to the bowl and which terminate in a circular path having straight delivery chutes in the same horizontal plane.

Fig. 11 is a sectional view taken along the line 1—1 of Fig. 10.

Figure 12:
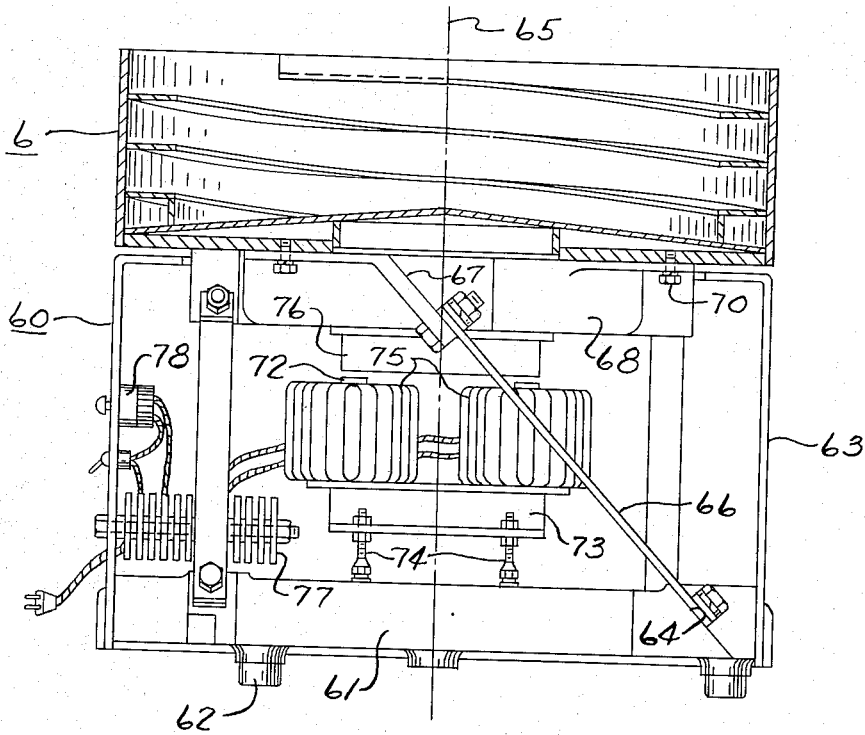
Fig. 12 is a view in elevation illustrating the feeder bowl shown in Fig. 1 mounted on a motor.

Referring to Figs. 1 and 2 of the drawings it is shown that the base 1 of the bowl comprises a heavy plate that is provided with the threaded openings 2 for receiving the fastening means for the purpose of securing the bowl to the frame or deck of a rotary feeding device.

The base plate 1, as shown in Fig. 2, is a large circular ring having a central opening 3 for receiving the ring member 4. The ring member 4 is constructed to support the floor member 5 which in this instance is conical and the ring member 4 engages the cone of the floor member 5 midway between the apex and the perimeter. The member 4 may be secured to the conical floor 5 by continuously welding the same thereto. The ring 4 is also welded to the base plate 1 to support the cone floor.

The side of the bowl is constructed of the cylindrical wall member 6 which is welded at its lower end to the base plate 1 as indicated at 7. The cylindrical wall 6 is likewise secured to the perimeter of the floor member 5 as indicated at 8. The multiconveyor path of the feeder bowl, as shown in Figs. 1 and 2, has two conveyor tracks or paths; one indicated at 10 and the other indicated at 11. The conveyor paths 10 and 11 spiral upwardly being continuously attached to the inner surface of the cylindrical bowl member 6. As shown in Fig. 1 each of the conveyor paths 10 and 11 starts at 180° from one another, although the conveyor path 11 terminates at the opposite side of the bowl from which it starts, as indicated at 12, and is provided with the straight spout member 13. On the other hand the conveyor member 10 terminates at 14 and is provided with a similar straight spout section 13. Each of the conveyor paths is provided with reject, bracket or clip members such as illustrated at 15 for the purpose of knocking off the articles that are not properly arranged on the respective conveyor paths. One reject clip is necessary for each conveyor path and they are conveniently positioned at 180° apart as shown in Fig. 1. The conveyor paths 10 and 11 are provided with a short closed-in wall section 16, as shown in Figs. 1 and 2, for the purpose of preventing the articles from lodging underneath and becoming bound within the conveyor bowl.

The structures as shown in Figs. 3 and 4 are similar to that shown in Fig. 1 in that the conveyor is made of a base ring member 1 having the threaded holes 2 and a large diameter central opening 3 for the ring member 4 that is attached to the floor 5. The bowl 6 is constructed in quite the same manner as that disclosed in Figs. 1 and 2 and the conveyor trough is of the opposite hand from that shown in in Fig. 2.

The conveyor path 17 starts at 180° from the lower end of the conveyor path 18. However the conveyor path 17 terminates substantially directly above the lower end of the path, as indicated at 20, being the outer chute of the two chutes or tracks. The conveyor path 18 likewise travels along a helical path and stays within the bowl 6 and its tangential terminating point 22 is beside that of the tangential terminal point 20 of the conveyor path 17. Each of the conveyor paths is provided with a straight end trough member, as indicated at 23, and each is provided with a reject bracket member as indicated at 24.

Thus the conveyor path 17 must have a spiral track from the point 25 to the point 26 where it again becomes circular being on the outside of the bowl 6. In Figs. 5 and 6 the bowl is shown to have counterclockwise multiconveyor paths 27 and 28. Both conveyor paths travel around the bowl 6 and adjacent their upper edges are provided with a railing member 30 to form a trough. The conveyor path 27 is the outer conveyor path at the discharge end as indicated at 31. The conveyor paths are spiral from the point of tangency 32 to the end 31. Each of the conveyor paths has a niche in its railing 30, as indicated at 33, for the purpose of ejecting a misarranged article before it reaches the point of discharge. The conveyor paths themselves slope in the same direction which is approximately 15° from the horizontal as illustrated at 34 in Fig. 6.

In the structure shown in Figs. 7, 8 and 9 the conveyor has three paths 35, 36 and 37 which start adjacent the floor 5 and are spaced at 120° from each other. Each of the paths is represented by the strips welded to the inner surface of the bowl 6 and when the first path 35 reaches the point 40 it passes through the wall 6 in the form of a tube 43. The second path 36 passes through the wall 6 as illustrated at 41 in the tube 44, and the path 37 passes through the wall 6 at the point indicated at 42 through the tube 45. Thus the three tubes 43, 44 and 45 represent the three different conveyor paths which extend spirally from their points of tangency at the interior of the bowl 6. It will be noticed in this instance that the tubes which represent the upper end of the conveyor paths are below the upper end of the bowl 6 and are supported by the brackets 46 secured to the outer surface of the cylindrical wall or bowl 6, as shown in these views. These conveying paths move the material in a counterclockwise direction in a manner very similar to that shown in Figs. 5 and 6.

The structures of Figs. 10 and 11 illustrate counterclockwise conveying paths extending from the bowl 6 and the three conveying paths 47, 48 and 49 start at the floor 5 at equal angular distances of 120° from one another as illustrated at 50, 51 and 52 in Fig. 10. The helical paths 47, 48 and 49 rise upwardly on the inner cylindrical wall of the bowl 6. The start of the first spiral 47 at 50 permits this spiral to continue around the inner surface of the bowl more times than the other two and it is the last one to come to the top as indicated in Fig. 10. The start of the second spiral 48 is at 51 which is the next to the last spiral to pass through the wall 6 as indicated at 53. The start of the third spiral path 49, as indicated at 52, permits this path to pass through the wall 6 as indicated at 55. Each path is provided with a tangential section which carries it from the point of tangency on the inner surface of the bowl member 6 to a larger diameter with the path 49 having to increase its diameter to permit the exit of the path 48 from its tangential point through the wall 6. Upwardly extending flanges are provided to segregate each of the three conveyor paths after their points of tangency with the bowl. Suitable rejector angle members may be placed at different positions to reject any of the articles that are not properly oriented in their travel around these conveyor paths.

Each of the bowls illustrated show the spiral paths leading from the bottom of the bowl upwardly on the inside thereof and the articles being discharged from the upper ends extend from the point of tangency of the helix. However the operation of these bowls can be reversed by operating the vibratory motor in the opposite direction which would cause the article to move downwardly. Nevertheless the specific bowls shown are designed for receiving a loose batch of articles on the floor of the bowl and the rotary vibration causes these articles to travel in a circular path and thus come to the starting points of each of the spiral conveyor paths from whence they are conveyed by vibratory motion to the upper end of the conveying paths.

Referring to Fig. 12 the feeder bowl 6 is mounted on an electromagnetic motor 60 which comprises the massive base 61 supported on the resilient feet 62 that carry the outer casing 63 that encloses the motor and control parts. The base 61 has the sloping seats 64 disposed symmetrically about the vertical central axis 65. The seats 64 support the springs 66 the upper ends of which are clamped to the corresponding spring seats 67 on the frame 68. The bowl 6 is bolted to the frame by the bolts 70.

The motor illustrated is of the electromagnetic type and has the core 72 mounted on the brackets 73 adjustably supported by the bolts 74 on the base 61. This core 72 is C-shaped and has its coil or field windings 75 on the legs thereof. The armature 76 is secured to the under side of the frame 68. The core member is then adjusted to provide the proper air gap between its poles and the armature. Each energy impulse of the field pulls on the armature which causes the springs 66 to flex in an inclined arcuate path of movement downwardly. When the energy impulse passes the springs return the bowl to its normal position. The momentum of the bowl and frame travels somewhat beyond the normal or static position but the springs are tuned to have a natural period of vibration a few cycles off the frequency of the current impulses supplied to the field coil. Thus the bowl reciprocating in its inclined arcuate movement keeps in synchronism with the energy impulses. To decrease the period, the current impulses of an alternating current source are cut in half by employing a half wave rectifier such as shown at 77. This rectifier and the rheostat 78 are placed in series with the motor field coil and the source of alternating current supply to control the magnitude of the reciprocation. A permanent magnet may be employed as the armature in place of the rectifier.

While, for clarity of explanation, certain embodiments of this invention have been shown and described, it is to be understood that this invention is capable of many modifications, and changes may be made in the construction and arrangement, and certain parts may be employed with the conjoint use of other parts and without departing from the spirit and scope of this invention.

I claim:

1. An article handling feeder bowl for delivering a series of articles in turn which comprises a feeder bowl having a feeding bottom with an upstanding annular wall, a plurality of helical conveyor track sections supported by the bowl and each starting at the bottom of the bowl and extending upwardly around the annular wall, a spiral conveyor track section connected to the end of each helical conveyor track section, each spiral conveyor track section extending to a common discharge position, and motor means to support and effect a reciprocation of said bowl in an inclined arcuate path of movement to feed articles from said bowl along said helical and spiral conveyor track sections to said common discharge position.

2. An article handling feeder bowl for delivering a series of articles in turn which comprises a feeder bowl having a feeding bottom with an upstanding annular wall, a plurality of helical conveyor track sections supported by the bowl and each starting at the bottom of the bowl and extending upwardly around the annular wall, a spiral conveyor track section connected to the end of each helical conveyor track section, a common conveyor track floor section supported by the bowl, each spiral conveyor track section connecting with said common conveyor track floor section, a dividing wall means supported on the common conveyor track floor section maintaining the separation of the conveyor track section along said common conveyor track floor to a common discharge position, and motor means to support and effect a reciprocation of said bowl in an inclined arcuate path of movement to feed articles from said bowl along said helical, spiral and common conveyor track floor sections to said common discharge position.

3. An article handling feeder bowl for delivering in turn a series of articles which comprises a feeder bowl having a feeding bottom with an upstanding annular wall, a plurality of helical conveyor track sections supported by the bowl and each starting at the bottom of the bowl and extending upwardly around the annular wall, a tubular spiral conveyor track section connected to the end of each helical conveyor track section, said tubular spiral conveyor track sections extending to a common discharge position, and motor means to support and effect a reciprocation of said bowl in an inclined arcuate path of movement to feed articles from said bowl along said helical and tubular spiral conveyor track sections to said common discharge position.

References Cited in the file of this patent

UNITED STATES PATENTS

| | | |
|---|---|---|
| 275,558 | Wills | Apr. 10, 1883 |
| 2,464,216 | Devol | Mar. 15, 1949 |
| 2,492,249 | Willard | Dec. 27, 1949 |
| 2,609,914 | Balsiger | Sept. 9, 1952 |
| 2,658,609 | Weyandt | Nov. 10, 1953 |

FOREIGN PATENTS

| | | |
|---|---|---|
| 279,119 | Great Britain | Oct. 15, 1927 |
| 943,865 | France | Mar. 21, 1949 |